United States Patent Office

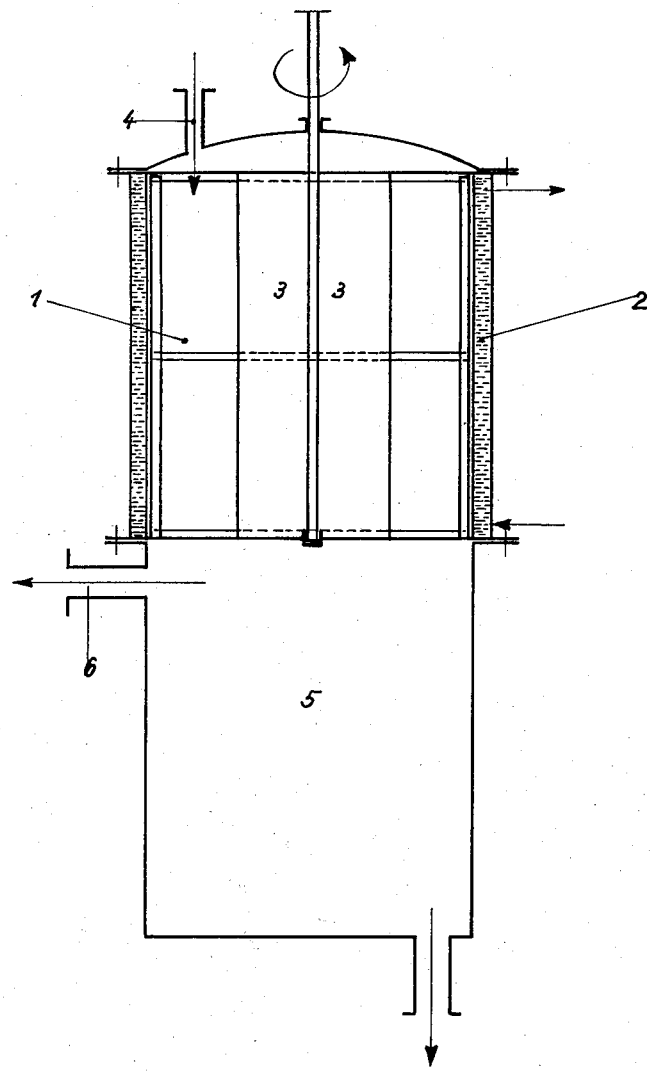

2,734,058
Patented Feb. 7, 1956

2,734,058

PROCESS FOR THE PRODUCTION OF SOLID FINELY DIVIDED, FLUFFY CYANURIC CHLORIDE FROM THE VAPOR PHASE

Hermann Schulz and Hans Huemer, Frankfurt am Main, Germany, assignors, by mesne assignments, to American Cyanamid Company, New York, N. Y.

Application December 19, 1952, Serial No. 326,898

4 Claims. (Cl. 260—248)

This invention relates to the preparation of solid cyanuric chloride from the vapor phase whereby the cyanuric chloride is recovered in a finely divided and fluffy state.

A further object of the invention relates to the separation of cyanuric chloride in a continuous process. The cyanuric chloride vapor passes into a condensation chamber and is there cooled to a temperature below the melting point of cyanuric chloride before it contacts the walls of the reaction chamber. The solidified cyanuric chloride then passes continuously to a collecting chamber.

Another object of this invention is a condensation chamber for the separation of the finely divided solid cyanuric chloride. The condensation chamber is provided with means for the passing of the gas and with other means to avoid the contact of molten and solidified cyanuric chloride with the walls of the condensation chamber.

In the hitherto known processes for the preparation of cyanuric chloride ex cyanogen chloride in the gas phase the product is recovered in a vaporous form and has to be solidified by means of cooling. The cyanuric chloride coming from the melt solidifies to an extremely hard almost glass like mass which firmly adheres to all parts of the reacting chamber. It is therefore difficult to carry out the condensation of the cyanuric chloride vapor in the usual apparatus because the danger of clogging the coolers or the like is imminent. Also, the mechanical removal of the hard cyanuric chloride batch from all kinds of separators is very difficult especially in view of the strong olfactory irritant. As cyanuric chloride has an extremely low thermal conductivity almost no heat exchange takes place at cooling planes coated with cyanuric chloride. The discharge of the heat of condensation and evaporation set free in the solidification process is the more difficult the stronger the deposit of cyanuric chloride is growing.

Hitherto these disadvantages arising from the separation process of cyanuric chloride had to be put up with and the preparation to be carried out discontinuously. Thereby a layer of cyanuric chloride is first precipitated on the walls of the chamber which gradually and increasingly dams off the heat exchange. Because of this damming off of the heat exchange the cyanuric chloride is primarily deposited in a molten state and not in a solid phase whereby glass hard layers of cyanuric chloride result increasingly hindering the heat exchange. The already mentioned cumbersome steps in removing the cyanuric chloride are also necessary in the mechanical comminution of the solid product whereby the fact that cyanuric chloride is susceptible of the moisture of the air is subject to excessive disadvantages. Therefore a continuous process for the preparation of cyanuric chloride from the vapor phase had not even been contemplated formerly.

According to the present invention the vaporous cyanuric chloride is not only continuously precipitated but it is also recovered in a finely divided fluffy state without any further mechanical comminution. By special means it is even possible to conduct the conversion of the vapor into the solid phase in such a manner that no strongly adhering hard batches of cyanuric chloride are formed at the walls of the condensation chamber and the total vaporous product from the condensation chamber is recovered as a fluffy powder which passes into a collecting vessel connected with the condensation chamber.

In practice, a flow of cyanuric chloride vapor is continuously passed into the upper part of a condensation chamber. The walls of the condensation chamber are cooled to an average temperature of not more than 110° C., preferably 70° C. with the principal object to avoid to the full extent the precipitation of molten or solid finely divided cyanuric chloride on the cooling walls of the condensation chamber. In order to inhibit the precipitation of still molten cyanuric chloride on the walls of the condensation chamber a fast heat discharge is provided by passing the vapor through the condensation chamber with moderate velocity. The solid cyanuric chloride in a finely divided state is continuously precipitated into a reaction vessel at the lower end of the condensation chamber and then removed, either periodically or continuously.

In the present method of our invention it is essential to choose diameter and height of the chamber in such a manner that the time of duration of the cyanuric chloride vapors in the free space of the reaction chamber is sufficient to avoid a contact with the cooling walls before the solidification has entirely finished, i. e. before the complete discharge of the evaporation and condensation heat. It has been observed that the time of duration has to be increased when the temperatures are raised within the limit of the average temperature in the condensation chamber.

It is essential that the vapor movement in the reaction chamber which furthers the heat discharge is conducted in such a manner that the vapors have no premature contact with the cooling walls in order to avoid a temporary deposit of molten cyanuric chloride at the walls. The moderate movement of the gas is performed by a slow running stirrer (about 60 revolutions per minute) provided in the longitudinal axis of the chamber whereby the propeller of the stirrer sweeps over the entire height of the condensation chamber. The width of the propeller blades should correspond to one sixth of the diameter of the reaction chamber thus leaving an annular space along the walls of the chamber measuring one third to two thirds of the radius of the chamber.

In order to remove the deposit of already solidified particles of cyanuric chloride at the cooling walls of the condensation chamber which hinders the heat exchange, it is desirable to provide scrapers connected with the stirrer. These scrapers sweep the entire height of the circular cooling walls of the chamber and practically remove an undesired layer of cyanuric chloride which is, for instance, thicker than a comparatively harmless coating of about 5 mm. thickness.

A further step to clean the walls of the condensation chamber is the passing of a flow of cold inert gas along the inner walls of the chamber. As such an inert gas, for instance, nitrogen may be used or with special advantage, preferably dried air. The supply of the cooling gas is carried out by an annular conduit in the upper part of the chamber along the inner walls which conduit is provided with a plurality of holes like a gas spray to supply the gas into the chamber. The holes are arranged in such a manner that the gas is blown along the inner walls of the condensation chamber thereby permanently covering these walls with a coat-like layer of gas.

In a further embodiment of special advantage the wall of the reaction chamber may either wholly or partly be permeable for gas, i. e., for instance, constructed of a porous ceramic mass. According to this embodiment the inert cooling gas, for instance, dried air, may be blown from all sides into the condensation chamber whereby any deposit of cyanuric chloride on the walls of the chamber is practically and efficiently inhibited.

In a reaction chamber with a larger diameter it is also possible to abandon the use of a stirrer with scrapers and to only rinse the walls with gas coming from an annular conduit or through a porous wall of the chamber.

It has further been discovered that after leaving the condensation chamber the inert cooling gas may be directed through gas coolers and the gas after filtering off the dragged along cyanuric chloride is finally recirculated into the reaction chamber. This procedure means an extremely low consumption of inert cooling gas.

With the present invention all difficulties and drawbacks arising in all hitherto known processes for the recovery of cyanuric chloride from the vapor phase are eliminated and in a continuous operation a product is obtained which shows all the advantages of a fluffy finely divided substance, i. e. an easy solubility and dispersibility as well as an excellent reactivity.

The major features of the present invention may be more readily described in conjunction with the following example with the accompanying drawing.

In the condensation of cyanuric chloride prepared by the catalytic recovery of cyanogen chloride in the gas phase a device is utilized as shown in the annexed drawing. The condensation chamber 1 consists in a plain cylinder of 1100 mm. diameter and 1000 mm. height, encased by a condenser jacket 2 and flown through by water with a temperature of 10 to 15° C. Through the slightly curved lid a shaft with several radially placed propellers 3 (about 60 revolutions per minute) is conducted. The propellers and the shaft are provided for the entire length of the condensation chamber thus saving a concentric annular space with a width of about one third to two thirds of the half diameter of the condensation chamber. In this annular space the hot cyanuric chloride vapors with a temperature of about 200° C. are supplied by a conduit 4 in the lid. The shaft is connected with narrow vertical scrapers by means of horizontal bars. These scrapers remove the solid particles of cyanuric chloride deposited on the wall of the condensation chamber. Below the condensation chamber the tank 5 with a suitable outlet for the finished product is provided. Near the upper end of the condensation chamber a gas outlet 6 is provided to carry off the gases dragged along with the vapor flow. The temperature of the waste gas is about 25° C. The inlet of the tank has the same diameter as the condensation chamber. It is essential that the cross-section of the whole apparatus from the inlet of the vapor until the discharge into the tank is neither tapered nor constricted in order to avoid undesired damming of material and breakdowns. With the thus described equipment 20 kg. per hour of cyanuric chloride in the form of finely divided fluffy white powder are obtained.

While the invention has been described with particular reference to specific embodiments, it is to be understood that it is not to be limited thereto but is to be construed broadly and restricted solely by the scope of the appended claims.

We claim:

1. Process for the recovery of cyanuric chloride from the vapor phase in a finely divided fluffy state which comprises: continuously passing cyanuric chloride vapor into a condensation chamber; controlling the rate of flow of said cyanuric chloride vapor into said chamber so that said flow is substantially completely converted to the solid phase before contact with the walls of said chamber; maintaining the average temperature of said chamber at a temperature of not more than about 110° C. by cooling the walls of said chamber; continuously cleaning the walls of said chamber of cyanuric chloride by scraper means; continuously agitating the vapor in said chamber by slowly revolving stirrer means, said stirrer means extending no more than about two thirds of the distance from the longitudinal axis to the walls of said chamber; and continuously recovering solid cyanuric chloride from said chamber.

2. Process according to claim 1 wherein said average temperature is about 70° C.

3. Process according to claim 1 wherein a layer of cool inert gas is continuously conducted along the inner walls of said chamber.

4. Process according to claim 3 wherein said cool inert gas comprises cool dried air.

References Cited in the file of this patent

UNITED STATES PATENTS

| | | |
|---|---|---|
| 1,463,216 | Krase et al. | July 31, 1923 |
| 2,206,189 | Hillhouse | July 2, 1940 |
| 2,219,996 | Livingston | Oct. 29, 1940 |
| 2,436,282 | Bennett | Feb. 17, 1948 |
| 2,608,472 | Flosdorf et al. | Aug. 26, 1952 |
| 2,676,963 | Pottschafer | Apr. 27, 1954 |
| 2,697,880 | Confraneesco | Oct. 26, 1954 |